US009018905B2

(12) United States Patent
Lim et al.

(10) Patent No.: US 9,018,905 B2
(45) Date of Patent: Apr. 28, 2015

(54) BATTERY MANAGEMENT APPARATUS OF HIGH VOLTAGE BATTERY FOR HYBRID VEHICLE

(75) Inventors: Jae Hwan Lim, Daejeon (KR); Jeong Hwan Yang, Busan (KR); Soo Yeup Jang, Daejeon (KR)

(73) Assignee: SK Innovation Co., Ltd. (KR)

( * ) Notice: Subject to any disclaimer, the term of this patent is extended or adjusted under 35 U.S.C. 154(b) by 392 days.

(21) Appl. No.: 13/517,306

(22) PCT Filed: Nov. 9, 2010

(86) PCT No.: PCT/KR2010/007861
§ 371 (c)(1),
(2), (4) Date: Jun. 29, 2012

(87) PCT Pub. No.: WO2011/078478
PCT Pub. Date: Jun. 30, 2011

(65) Prior Publication Data
US 2012/0256488 A1 Oct. 11, 2012

(30) Foreign Application Priority Data
Dec. 21, 2009 (KR) .......................... 10-2009-0127889

(51) Int. Cl.
*H02J 7/00* (2006.01)
*B60L 11/18* (2006.01)

(52) U.S. Cl.
CPC ......... *B60L 11/1866* (2013.01); *B60L 11/1861* (2013.01); *B60L 11/1872* (2013.01); *Y02T 10/7005* (2013.01); *Y02T 10/7044* (2013.01); *Y02T 10/7061* (2013.01); *Y02T 90/16* (2013.01)

(58) Field of Classification Search
CPC ........... H02J 9/00; H02J 7/004; H02J 7/0008; B06L 11/1851; B06L 11/1611; G06F 1/3265
USPC .................................. 320/116, 134, 150–153
See application file for complete search history.

(56) References Cited

U.S. PATENT DOCUMENTS

2008/0272736 A1* 11/2008 Tien et al. ..................... 320/126
2009/0011916 A1    1/2009 Steidl
(Continued)

FOREIGN PATENT DOCUMENTS

| EP | 2065268 | 6/2009 |
| KR | 1020080032454 | 4/2008 |
| WO | 8604150 | 7/1986 |

OTHER PUBLICATIONS

International Search Report—PCT/KR2010/007861 dated Jul. 28, 2011.

*Primary Examiner* — Paul Dinh
(74) *Attorney, Agent, or Firm* — Cantor Colburn LLP

(57) ABSTRACT

The present invention relates to a battery management apparatus of a high voltage battery for a hybrid vehicle, in more detail, a battery management apparatus of a high voltage battery for a hybrid vehicle which includes: a plurality of battery packs including a plurality of unit cells; slave battery management modules measuring and monitoring temperature and voltage of the unit cells in the battery packs; temperature/voltage measurement wires connecting the unit cells with adjacent unit cells for the slave battery management modules to measure temperature and voltage between the unit cells and the adjacent unit cells; a master battery management module connected with the slave battery management modules; and communication wires connecting the modules.

13 Claims, 3 Drawing Sheets

(56) References Cited

U.S. PATENT DOCUMENTS

| | | |
|---|---|---|
| 2009/0115377 A1 | 5/2009 | Schwenke et al. |
| 2009/0118916 A1 | 5/2009 | Kothari et al. |
| 2009/0146610 A1* | 6/2009 | Trigiani .................. 320/119 |
| 2010/0001523 A1 | 1/2010 | Sato et al. |
| 2010/0295382 A1* | 11/2010 | Tae et al. .................. 307/150 |

* cited by examiner

BATTERY MANAGEMENT APPARATUS OF HIGH VOLTAGE BATTERY FOR HYBRID VEHICLE

TECHNICAL FIELD

The present invention relates to a battery management apparatus of a high voltage battery for a hybrid vehicle, in more detail, a battery management apparatus of a high voltage battery for a hybrid vehicle which has less wires and volume for disposing a slave battery management module that measures and monitors temperature and voltage of unit cells of a high voltage battery in a hybrid vehicle.

BACKGROUND ART

Vehicles equipped with an internal combustion engine generally using gasoline or heavy oil as fuel have a serious influence on environmental pollution and air pollution. Therefore, a great of effort has been made to develop electric vehicles or hybrid vehicles in recent years to reduce the air pollution.

Recently, high-output rechargeable batteries using non-aqueous electrolyte with high energy concentration have been developed. The high-output rechargeable battery are connected in series to implement a large-capacity rechargeable battery, in order to be used in apparatuses requiring a large amount of power for operating a motor, such as the electric vehicles.

As described above, one large-capacity rechargeable battery (hereafter, referred to as battery") is commonly composed of a plurality of rechargeable batteries connected in series. In the battery, particularly a battery for HEVs, several or tens of rechargeable batteries are alternately charged and discharged, such that it is required to manage the batteries such that they maintain appropriate operation by controlling the charging and discharging.

For this configuration, a BMS (Battery Management System) that manages the general states of the battery is provided. The BMS estimates SOC by detecting voltage, current, and temperature etc. of the battery and performing calculation, and controls the SOC to make the fuel efficiency of vehicles best.

FIG. 1 is a diagram showing the configuration of a battery management system according to the related art.

As shown in FIG. 1, the existing management system includes a battery pack formed by laminating battery unit cell in a line, a battery management system is disposed apart from the battery pack, and each unit cell of the battery pack is connected with the battery management system. Therefore, each of n unit cells are connected by two wires, such that information on the n unit cells is sensed and the operation is controlled. In this configuration, the battery cells should be connected to one battery management system such that the battery management systems senses voltage and temperature of the unit cells; therefore, the wire harness become necessarily complicated.

Therefore, the length of the wires connecting the battery management system with the battery pack increases, such that the cost increases and a large volume is required. Further, since the battery management system is disposed apart from the unit cells, spaces for them should be ensured.

Further, the lengths of the wires from the unit cells to the battery management system are different for each wire, such that it is difficult to expect accurate sensing because voltage drops due to wire resistance are different.

Further, it is required to redesign the battery pack case protecting the unit cells, the wires for sensing cell voltage, connectors that connect the wires with the slave battery management modules, and the cell voltage and temperature sensing circuit, in order to change the number of unit cells due to change of voltage of the battery pack.

DISCLOSURE OF INVENTION

Technical Problem

The present invention relates to a battery management apparatus of a high voltage battery for a hybrid vehicle, in more detail, a battery management apparatus of a high voltage battery for a hybrid vehicle which includes: a plurality of battery packs including a plurality of unit cells; slave battery management modules measuring and monitoring temperature and voltage of the unit cells in the battery packs; temperature/voltage measurement wires connecting the unit cells with adjacent unit cells for the slave battery management modules to measure temperature and voltage between the unit cells and the adjacent unit cells; a master battery management module connected with the slave battery management modules; and communication wires connecting the modules.

Solution to Problem

The present invention has been made in effort to solve the problems and it is an object of the present invention to provide a battery management apparatus of a high voltage battery management for a hybrid vehicle that uses a less number of wires for connecting battery packs with slave battery management modules in disposing them, and occupies a small space.

Further, it is another object of the present invention to provide a battery management apparatus of a high voltage battery for a hybrid vehicle which can achieve accurate sensing by reducing differences in length of wires connecting unit cells with the battery management system to reduce voltage drop due to wire resistance.

Further, it is another object of the present invention to provide a battery management apparatus of a high voltage battery for a hybrid vehicle which can be easily used even though the voltage of a battery pack changes.

In order to achieve the objects of the present invention, a battery management apparatus of a high voltage battery for a hybrid vehicle for operating a motor in the hybrid vehicle, includes: a plurality of battery packs 210, 220, 230 each including a plurality of unit cells stacked in two lines; slave battery management modules 201, 202, 203 measuring and monitoring temperature and voltage of the unit cells in the battery packs 210, 220, 230 to monitor the state of the unit cells in the battery packs 210, 220, 230; temperature/voltage measurement wires 240 connecting terminals of the unit cells in one line of each of the battery packs 210, 220, 230 and terminals of the unit cells in adjacent lines to the slave battery management modules 201, 202, 203; a master battery management module 200 connected with the slave battery management modules 201, 202, 203, receives cell voltage and temperature information of the battery packs 210, 220, 230, and transmits cell balancing information to the slave battery management modules 201, 202, 203; and communication wires 250 connecting the slave battery management modules 201, 202, 203 with the master battery management module 200.

Further, the slave battery management modules 201, 202, 203 are positioned on the battery packs 210, 220, 230 between the unit cells stacked in two lines, the terminals of the unit cells in one line and the terminals of the unit cells in the other line are spaced at the same distance from the slave battery management modules 201, 202, 203.

Further, the slave battery management modules 201, 202, 203 are positioned at the sides of the battery packs 210, 220, 230 at sides of the unit cells in one line, the terminals are positioned at the ends of the unit cells and installed at the centers of the battery packs 210, 220, 230 such that the terminals of the unit cells in one line and the terminals of the unit cells in the adjacent line are adjacent to each other.

Further, the battery packs 210, 220, 230 are installed in a line, adjacent to each other.

Further, the slave battery management modules 201, 202, 203 are integrally installed with the battery packs 210, 220, 230.

Further, the slave battery management modules 201, 202, 203 and the master battery management module 200 are connected in series by the communication wires.

According to the present invention, since less wires are used to connecting the battery packs with the slave battery management modules in installing them, such that it is possible. Further, it is possible to ensure a space by reducing the space that is occupied by the wires and the slave battery management modules. Further, it is possible to easily use the present invention by increasing or decreasing the number of battery packs, when the voltage of the battery packs changes.

Further, it is possible to minimize voltage drop due to difference in length of the wires, because it is possible to make the lengths of the wires the same, when the slave battery management modules are positioned between the unit cells in the two lines of the battery packs.

Advantageous Effects of Invention

According to the present invention, since less wires are used to connecting the battery packs with the slave battery management modules in installing them, such that it is possible. Further, it is possible to ensure a space by reducing the space that is occupied by the wires and the slave battery management modules.

BEST MODE FOR CARRYING OUT THE INVENTION

Hereinafter, a battery management apparatus of a high voltage battery for a hybrid vehicle according to the present invention is described hereafter in detail with reference to the accompanying drawings.

Figure 2:
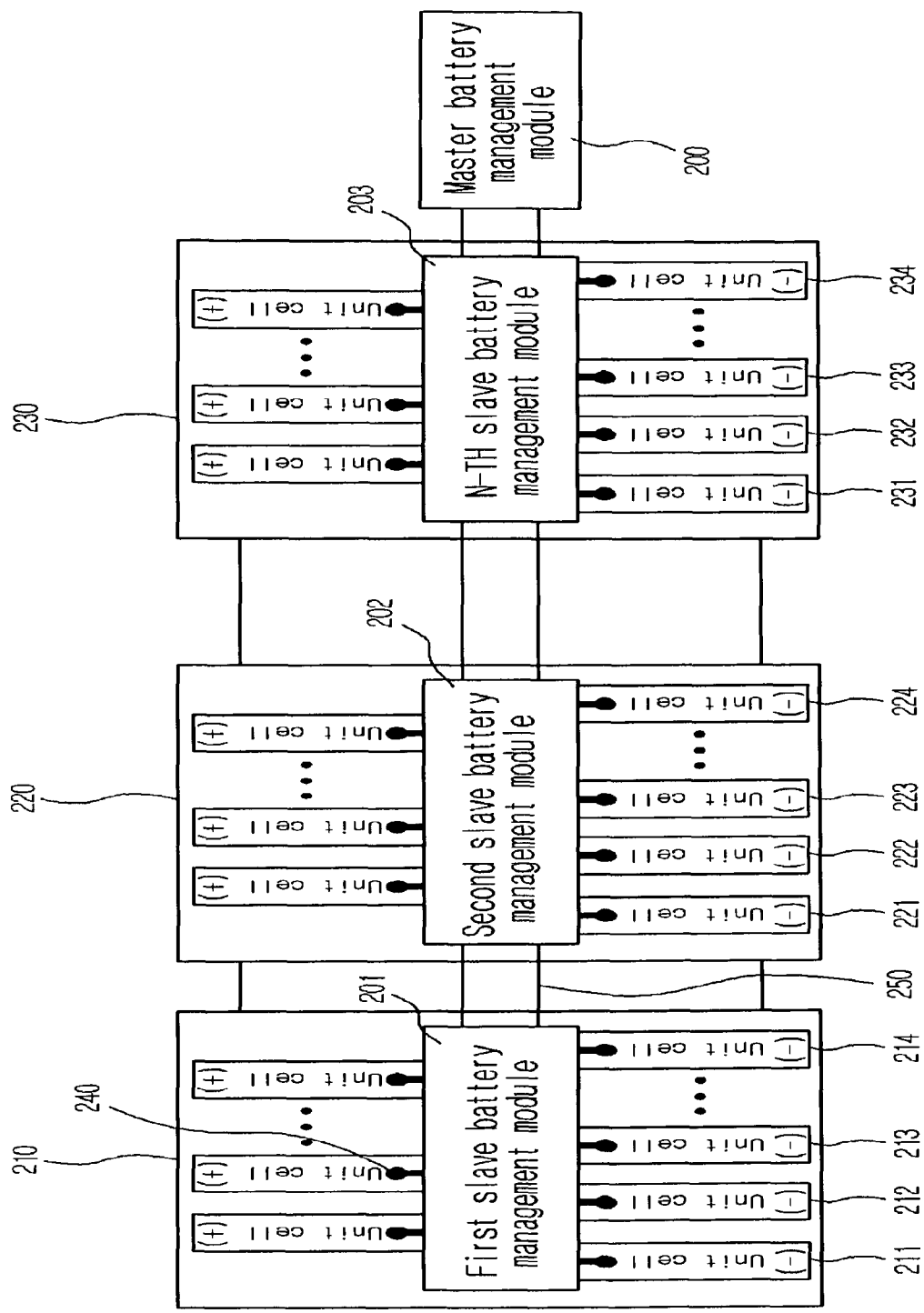
FIG. 2 is a diagram showing an example of a battery management apparatus of a high voltage battery for a hybrid vehicle according to the present invention.
Figure 3:
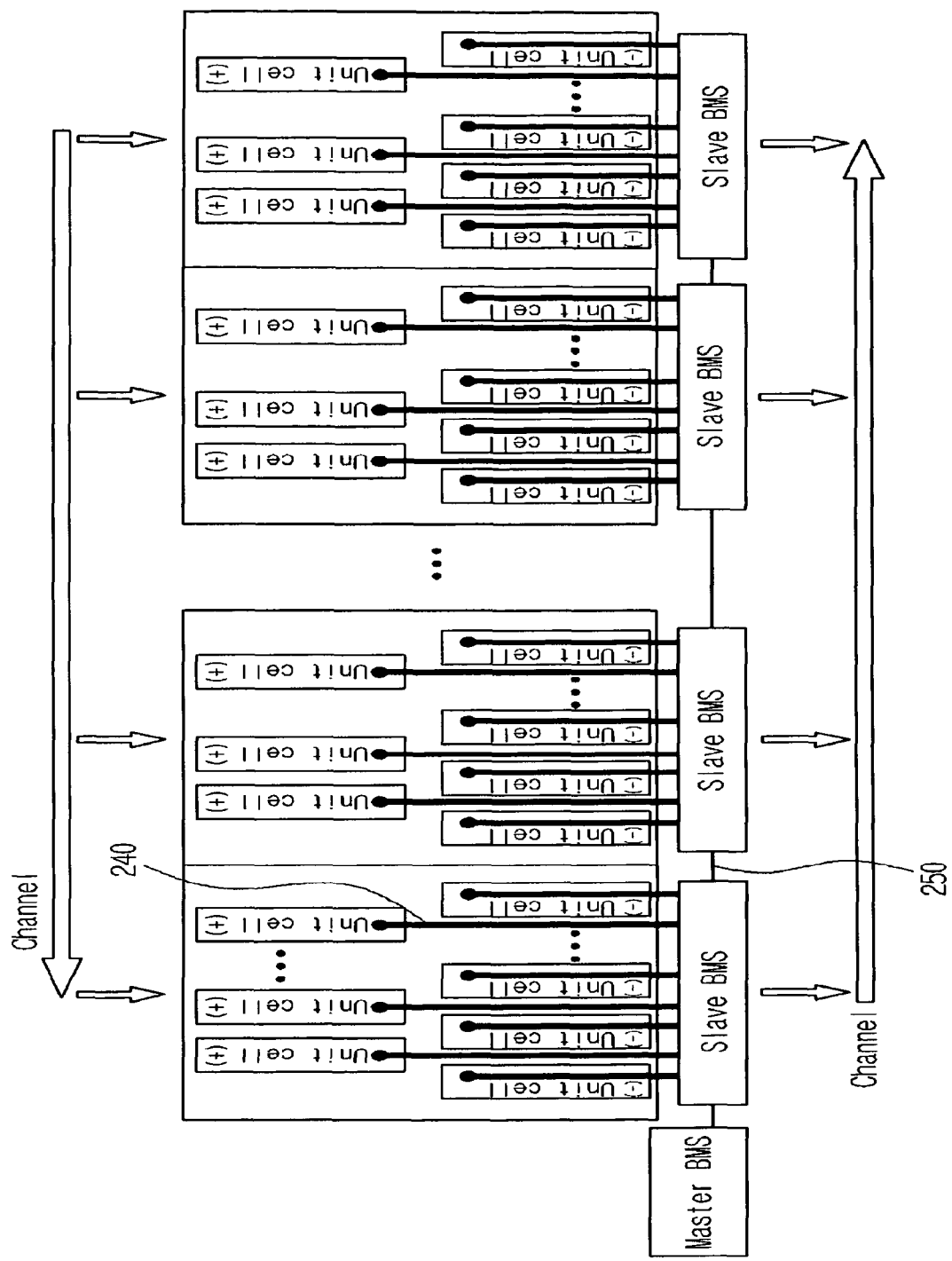
FIG. 3 is a diagram showing anther example of a battery management apparatus of a high voltage battery for a hybrid vehicle according to the present invention.

FIG. 2 is a perspective view showing an example of a battery management apparatus of a high voltage battery for a hybrid vehicle according to the present invention and FIG. 3 is a perspective view showing another example of a battery management apparatus of a high voltage battery for a hybrid vehicle according to the present invention.

The present invention relates to a battery management apparatus of a high voltage battery for a hybrid vehicle for operating a driver in the hybrid vehicle.

A high voltage battery management for a hybrid vehicle of the present invention includes: a plurality of battery packs 210, 220, 230 each including a plurality of unit cells; slave battery packs 201, 202, 203 measuring and monitoring temperature and voltage of the unit cells in the battery packs 210, 220, 230; temperature/voltage measurement wires 240 allowing the slave battery management modules 201, 202, 203 to measure temperature and voltage between unit cells and adjacent unit cells by connecting the unit cells and the adjacent unit cells; a master battery management module 200 connected with the slave battery management modules 201, 202, 203; and communication wires 250 connecting the modules.

The battery packs 210, 220, 230 each include a plurality of unit cells stacked in two lines. The unit cells in one line and the unit cells in the adjacent line are connected in series, respectively.

The slave battery management modules 201, 202, 203 measure and monitor temperature and voltage among the unit cell of the battery packs 210, 220, 230 to monitor the state of the unit cells of the battery packs 210, 220, 230.

Terminals of the unit cells in one line and terminals of the unit cells in the adjacent line of each of the battery packs 210, 220, 230 are connected to the slave battery management modules 210, 201, 203 by the temperature/voltage measurement wires 240 in order to measure and monitor the temperature and the voltage among the unit cells in the battery packs 210, 220, 230.

Figure 1:
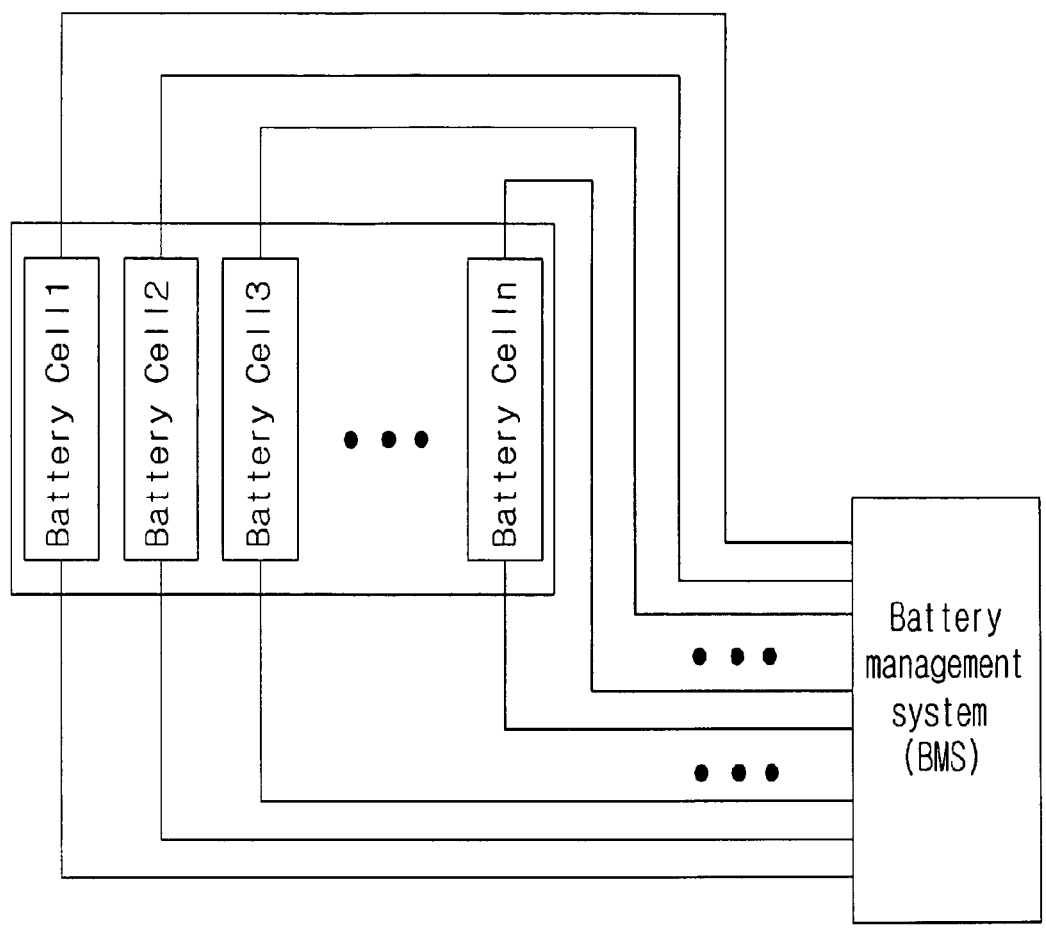
FIG. 1 is a diagram showing the configuration of a battery management system according to the related art.

In this configuration, it is preferable that the slave battery management modules 201, 202, 203 are positioned on the battery packs 210, 220, 230 between the unit cells staked in two lines, as shown in FIG. 1, or positioned at the sides of the battery packs 210, 220, 230 at one side of the unit cells in one line, as shown in FIG. 3.

It is preferable that the terminals of the unit cells in one line and the terminals of the unit cells in the adjacent line are spaced at the same distance from the slave battery management module 201, 202, 203, when the slave battery management modules 201, 202, 203 are positioned on the battery packs 210, 220, 230 between the unit cells stacked in two lines.

When the terminals of the unit cells are spaced at the same distance from the slave battery management modules 201, 202, 203, as described above, it is possible to make the length of the temperature/voltage measurement wires 240 the same, such that it is possible to accurately measure the voltage and the temperature by minimizing voltage drop due to differences in length of the wires.

When the slave battery management modules 201, 202, 203 are positioned at the sides of the battery packs 210, 220, 230 at sides of the unit cells in one line, as shown in FIG. 3, it is preferable that the terminals are positioned at the ends of the unit cells and installed at the centers of the battery packs 210, 220, 230 such that the terminals of the unit cells in one line and the terminals of the unit cells in the adjacent line are adjacent to each other.

When the terminals of the unit cells are positioned at the ends of the unit cells and installed at the centers of the battery packs 210, 220, 230, as described above, it is possible to reduce differences in length of the temperature/voltage measurement wires 240, such that it is possible to accurately measure the voltage and the temperature by reducing voltage drop due to differences in length of the wires.

The slave battery management modules 201, 202, 203 may be integrally formed with the battery packs 210, 220, 230, respectively. For example, the slave battery management modules 201, 202, 203 may be detachably attached to the battery packs, by fastening grooves.

As shown in FIG. 2, the first slave battery management module 201 may be integrally installed to the first battery pack 210, the second slave battery management module 202 may be integrally installed to the second battery pack 220, and the N-th slave battery management module 203 may be integrally installed to the N-th battery pack 230.

The first slave battery management module 201 to the N-th slave battery management module 203 may be connected in series by communication wires 250. That is, the first slave battery management module 201 may be connected with the second slave battery management module 202 and the second slave battery management module 202 may be connected with the third slave battery management module 203. The N–1-th slave battery management module may be connected with the N-th slave battery management module 203 and the N-th slave battery management module 203 may be connected with the master battery management module 200, by the series connection.

Further, the master battery management module 200 is connected with the slave battery management modules 201, 202, 203, receives the voltage and temperature information of the battery packs, and transmits cell balancing information to the slave battery management modules.

The first slave battery management module 201 to the N-th slave battery management module 203 generate information on the battery packs for the voltage and the temperature of one or more unit cells in the battery pack and transmit the information to adjacent slave battery management modules or the master battery management module.

For example, the first slave battery management module 201 can generate information on the first unit cell for the voltage and the temperature among the 1-1-th unit cell 211 to the 1-a-th unit cell 214 and transmit the information to the second slave battery management module 202.

The second slave battery management module 202 generates information on the second unit cell for the voltage and the temperature of the 2-1-th unit cell 221 to the 1-b-th unit cells 224. The second slave battery management module 202 can transmit the information on the second unit cell to the third slave battery management module, together with the information on the first unit cell which is received from the first slave battery management module 201.

In accordance with this process, the N–1-th slave battery management module can generate N–1-th unit cell information and then transmit the first unit cell information to the N–1-th unit cell information to the N-th slave battery management module 203.

The N-th slave battery management module 203 can generate information on the N-th unit cell and then transmit the cell information of the first battery pack to the cell information of the N–1-th battery pack which are received from the N–1-th slave battery management module, and the cell information of the N-th battery pack, to the master battery management module 200.

As the first slave battery management module 201 to the N-th slave battery management module 203 are connected in series, the master battery management module 200 can receive the unit cell information on all of the unit cell from the N-th slave battery management module 203. That is, the master battery management module can acquire information on all of the unit cells, even if it is not connected with all of the unit cells or all of the slave battery management modules.

The master battery management module 200 transmits balancing information including the first cell balancing information to the N-th slave balancing information which correspond to the first slave battery management module 201 to the N-th slave battery management module 203, respectively, to the N-th slave battery management module 203. The cell balancing information can include voltage control information and temperature control information about the cells of the battery packs.

The N-th slave battery management module 203 acquires the N-th cell balancing module from the cell balancing information received from the master battery management module 200 and then transmits the cell balancing information to the N–1-th slave battery management module. The N-th slave battery management module 203 can control the voltage and the temperature of the N–1-th unit cell 231 to the N-n-th unit cells 234 in accordance with the acquired N-th cell balancing information.

The second slave battery management module 202 acquires the second cell balancing information from the cell balancing information received from the third slave battery management module and then transmits the cell balancing information to the first slave battery management module 201 through this process. The second slave battery management module 202 can control the voltage and the temperature of the 2-1-th unit cell 221 to the 2-b-th unit cell 224 in accordance with the acquired second balancing information.

Further, the first slave battery management module 201 acquires the first cell balancing information from the cell balancing information received from the second slave battery management module 202. The first slave battery management module 201 can control the voltage and the temperature of the 1-1-th unit cell 211 to the 2-a-th unit cell 214 in accordance with the acquired first cell balancing information.

The master battery management module 200 is connected with the slave battery management modules 201, 202, 203 by the communication wires 250, receives cell voltage and temperature information sensed by the slave battery management modules 201, 202, 203, and transmits and controls balancing instructions corresponding to the slave battery management modules 201, 202, 203 to the slave battery management modules 201, 202, 203. The temperature control allows fans to be operated by the sensing of temperature sensors in the slave battery management modules 201, 202, 203, fluid flows through cooling channels by the operation of the fans, and the cooling channels are connected to the cells in the battery packs, such that the temperature of the battery packs can be adjusted.

Further, it is preferable that the battery packs 210, 220, 230 are installed in a line, adjacent to each other, and the slave battery management modules 201, 202, 203 are connected in series. As described above, the battery packs 210, 220, 230 are installed in a line, adjacent to each other and the slave battery management modules 201, 202, 203 are connected in series, such that it is possible to reduce the lengths of the communication wires 250 connecting the slave battery management modules 201, 202, 203 with each other and the slave battery management modules 201, 202, 203 with the master battery management module 200.

Further, since the slave battery management modules are connected in series, it is possible to easily add unit cells only by forming a battery pack including a desired number of unit cells and attaching a slave battery management module to the battery pack such to be connected with an adjacent slave battery management module or the master battery management module by a communication wire. Further, where a battery pack has a problem, it is required only to replace the battery pack with the problem, such that maintenance is easy.

The invention claimed is:

1. A battery management apparatus of a high voltage battery for a hybrid vehicle for operating a motor in the hybrid vehicle, comprising:
 a plurality of battery packs each including a plurality of unit cells stacked in two lines;
 slave battery management modules measuring and monitoring temperature and voltage of the unit cells, the slave battery management modules being detachably and integrally installed with the battery packs through fastening grooves formed in the battery packs, so as to monitor the state of the unit cells in the battery packs;
 temperature/voltage measurement wires connecting terminals of the unit cells in one line of each of the battery packs and terminals of the unit cells in adjacent lines to the slave battery management modules;
 a master battery management module connected with the slave battery management modules to receive cell voltage and temperature information of the battery packs, and to transmit cell balancing information to the slave battery management modules; and
 communication wires connecting the slave battery management modules with the master battery management module in series,
 wherein the master battery management module acquires information on all of the unit cells from the adjacent slave battery management modules connected in series through the communication wires.

2. The high voltage battery management apparatus for a hybrid voltage according to claim 1, wherein the slave battery management modules are positioned on the battery packs between the unit cells stacked in two lines, the terminals of the unit cells in one line and the terminals of the unit cells in the other line are spaced at the same distance from the slave battery management modules.

3. The high voltage battery management apparatus for a hybrid voltage according to claim 1, wherein the slave battery management modules are positioned at the sides of the battery packs at sides of the unit cells in one line, the terminals are positioned at the ends of the unit cells and installed at the centers of the battery packs such that the terminals of the unit cells in one line and the terminals of the unit cells in the adjacent line are adjacent to each other.

4. The high voltage battery management apparatus for a hybrid voltage according to claim 1, wherein the battery packs are installed in a line, adjacent to each other.

5. The high voltage battery management apparatus for a hybrid voltage according to claim 2, wherein the battery packs are installed in a line, adjacent to each other.

6. The high voltage battery management apparatus for a hybrid voltage according to claim 3, wherein the battery packs are installed in a line, adjacent to each other.

7. A battery management apparatus of a high voltage battery for a hybrid vehicle for operating a motor in the hybrid vehicle, comprising:
 a plurality of battery packs each including a plurality of unit cells stacked in two groups, each group of unit cells aligned in a row;
 a slave battery management module for each of the plurality of battery packs, the slave battery pack measuring and monitoring temperature and voltage of the unit cells of the battery pack so as to monitor a state of the battery pack, the slave battery management module detachably attached to the battery, the plurality of slave battery management modules connected in series by communication wires;
 a plurality of temperature and voltage measurement wires connecting terminals of one group of unit cells of the battery pack to the slave battery management module and connecting terminals of the other group of unit cells to the slave battery management module; and
 a master battery management module connected to a particular slave battery management module of the plurality of slave battery management modules by communication wires, the master battery management module receiving cell voltage and temperature information of all of the battery packs via the particular slave battery management module, the master battery management module transmitting cell balancing information to all of the plurality of slave battery management modules via the particular slave battery management module.

8. The high voltage battery management apparatus of claim 7, wherein the slave battery management module for each battery pack is positioned between the two groups of the unit cells of the battery pack, wherein lengths of the temperature and voltage wires connecting the slave battery management module to the terminals of one group of unit cells and the terminals of the other group of unit cells are the same.

9. The high voltage battery management apparatus of claim 8, wherein the battery packs are aligned in a row.

10. The high voltage battery management apparatus of claim 7, wherein the slave battery management module for each battery pack is positioned at sides of the two groups of the unit cells of the battery pack such that the terminals of one group of unit cells and the terminals of the other group of unit cells are adjacent to each other.

11. The high voltage battery management apparatus of claim 10, wherein the battery packs are aligned in a row.

12. The high voltage battery management apparatus of claim 7, wherein the battery packs are aligned in a row.

13. The high voltage battery management apparatus of claim 7, wherein the slave battery management module for each battery pack is detachably attached to the battery pack by fastening grooves formed in the battery pack.

* * * * *